(12) United States Patent
O'Reilly

(10) Patent No.: US 10,300,974 B1
(45) Date of Patent: May 28, 2019

(54) BALANCE BIKE CONVERSION SYSTEMS

(71) Applicant: Phillip O'Reilly, Union, OR (US)

(72) Inventor: Phillip O'Reilly, Union, OR (US)

(73) Assignee: O'Reilly Enterprises, Inc, Union, OR (US)

( * ) Notice: Subject to any disclaimer, the term of this patent is extended or adjusted under 35 U.S.C. 154(b) by 36 days.

(21) Appl. No.: 15/590,793

(22) Filed: May 9, 2017

Related U.S. Application Data

(60) Provisional application No. 62/454,342, filed on Feb. 3, 2017.

(51) Int. Cl.
| | | |
|---|---|---|
| *B62K 13/08* | (2006.01) | |
| *B62M 1/36* | (2013.01) | |
| *B62K 9/00* | (2006.01) | |
| *B62J 23/00* | (2006.01) | |
| *B62J 25/00* | (2006.01) | |
| *A63B 69/16* | (2006.01) | |
| *B62H 7/00* | (2006.01) | |
| *B62J 99/00* | (2009.01) | |

(52) U.S. Cl.
CPC ............... *B62J 23/00* (2013.01); *B62J 25/00* (2013.01); *A63B 69/16* (2013.01); *B62H 7/00* (2013.01); *B62J 99/00* (2013.01)

(58) Field of Classification Search
CPC ........... B62J 23/00; B62J 25/00; A63B 69/16; B62H 7/00
See application file for complete search history.

(56) References Cited

U.S. PATENT DOCUMENTS

| | | | |
|---|---|---|---|
| 4,487,424 A | 12/1984 | Ellis | |
| 5,320,583 A | 6/1994 | van Wingen vorn Looyen | |
| 6,431,301 B1* | 8/2002 | Forbes | B62K 3/002 180/185 |
| 6,443,865 B1 | 9/2002 | Yamanaka | |
| 7,798,513 B1* | 9/2010 | Salvant | B62H 7/00 280/259 |
| D659,597 S | 5/2012 | Chen | |
| 8,464,609 B2* | 6/2013 | Shiu | B62K 13/00 280/278 |
| 8,707,825 B2 | 4/2014 | Shiu et al. | |
| 9,669,891 B2* | 6/2017 | Evans | B62K 9/00 |
| 2002/0033070 A1 | 3/2002 | Harrington | |
| 2004/0201199 A1* | 10/2004 | Liebetrau | B62H 7/00 280/278 |
| 2006/0128512 A1 | 6/2006 | Tetsuka et al. | |
| 2008/0161146 A1 | 7/2008 | Shiraishi et al. | |

(Continued)

*Primary Examiner* — Tony H Winner
(74) *Attorney, Agent, or Firm* — Small Business Legal Clinic Lewis & Clark Law School

(57) ABSTRACT

A balance bike conversion system may include first and second protective inserts, each having an interface adapted to engage opposite ends of a bicycle bottom bracket. A connector may be adapted to connect the first and second protective inserts, thereby securing the inserts to the bottom bracket. The connector may be adapted to adjust the distance between the inserts, thereby accommodating variability in the width of the bottom bracket. The system may further include adapters to enable the system to be used with bicycles having bottom brackets with different diameters. The protective inserts and/or adapters may provide mechanical support to the bottom bracket, thereby protecting it from damage.

19 Claims, 22 Drawing Sheets

(56) References Cited

U.S. PATENT DOCUMENTS

| | | | |
|---|---|---|---|
| 2008/0164673 A1* | 7/2008 | Lane | B62M 3/003 |
| | | | 280/259 |
| 2009/0145262 A1 | 6/2009 | Pasqua et al. | |
| 2010/0064845 A1 | 3/2010 | French | |
| 2011/0198479 A1 | 8/2011 | Mola et al. | |
| 2014/0157951 A1 | 6/2014 | Dubois et al. | |
| 2014/0274582 A1* | 9/2014 | Simmons | A63B 69/16 |
| | | | 482/57 |
| 2014/0319797 A1 | 10/2014 | Emmons | |
| 2015/0035248 A1* | 2/2015 | Baron | B62K 9/00 |
| | | | 280/259 |
| 2016/0001843 A1* | 1/2016 | Evans | B62K 9/00 |
| | | | 280/7.17 |
| 2016/0288856 A1 | 10/2016 | Chamberlain et al. | |
| 2018/0222549 A1* | 8/2018 | Ragland | B62M 6/70 |

\* cited by examiner

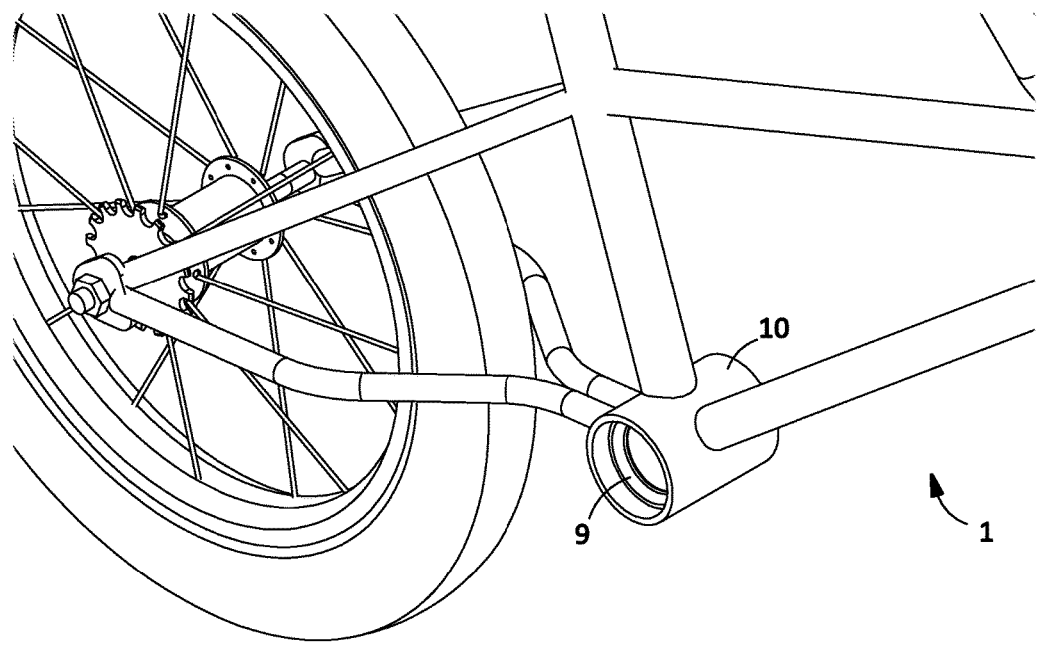
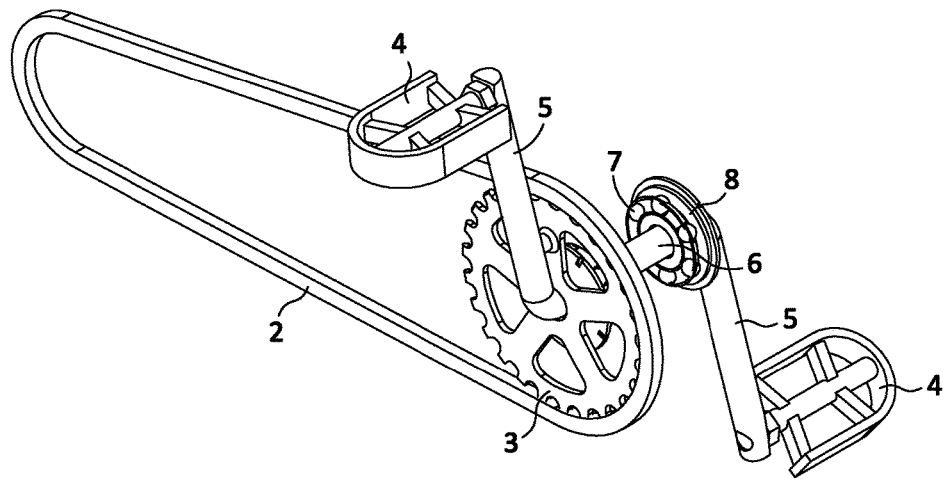
FIG. 2
(Prior Art)

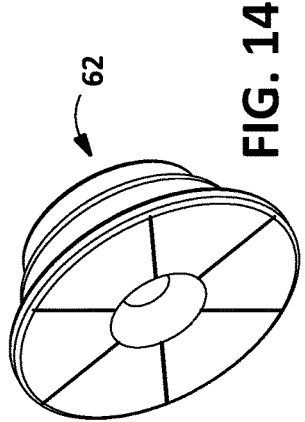
FIG. 14
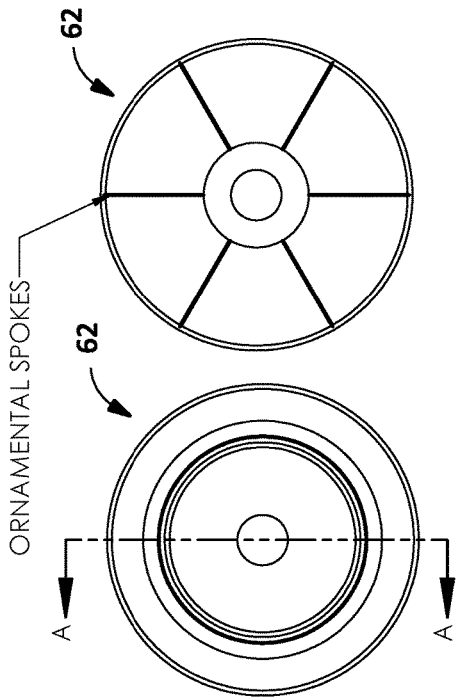
FIG. 15
FIG. 16
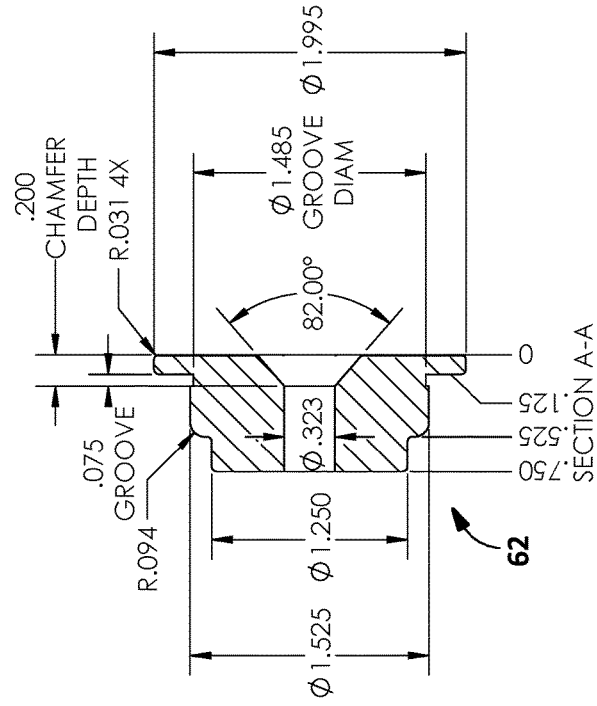
FIG. 17

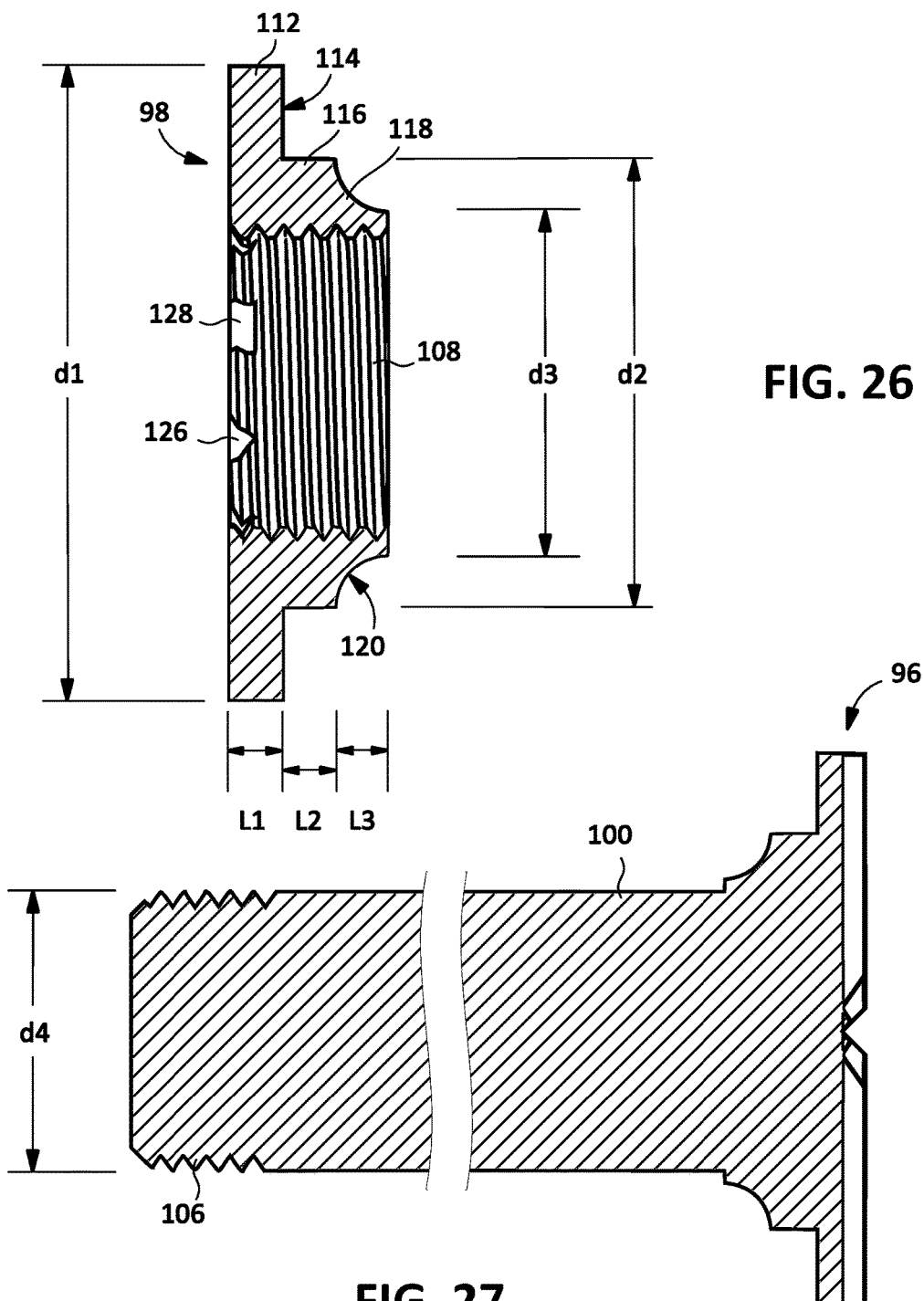

US 10,300,974 B1

BALANCE BIKE CONVERSION SYSTEMS

CROSS-REFERENCE TO RELATED APPLICATIONS

This application claims priority from U.S. Provisional Patent Application No. 62/245,342 filed Feb. 3, 2017 titled Balance Bike Adapter which is incorporated by reference.

BACKGROUND

Learning to ride a bicycle can be challenging because it requires the simultaneous exercise of multiple skills such as balancing and pedaling which is especially difficult for people with limited coordination. Many people find the learning processes to be easier when it is broken down into individual skills. This can be accomplished through the use of a balance bike which is essentially a bicycle with no pedaling mechanism. The rider propels a balance bike by coasting downhill or pushing off the ground with their feet. This isolates the steering and balancing skills from the pedaling skills and eliminates the fear of scraping ankles on pedals. Once the ability to balance and steer a balance bike has become second nature without the distraction of pedals, the rider can switch to a pedal bicycle and complete the learning process.

Balance bikes are available from many sources, but it is difficult to justify purchasing a product that will only be used for a short period of time during the learning process. Some consumers have addressed this problem by obtaining a pedal bike 1 as shown in FIG. 1 and simply removing the pedals 4, cranks 5, spindle 6, bearings 7 cones (or inner bearing races) 8 and/or various other drive components such as chain guards and brackets from a pedal bicycle to convert it to a homemade balance bike as shown in FIG. 2. However, this leaves unprotected openings in the bicycle frame which allows dirt, water and other contaminants to enter the frame and compromise the interior of the bottom bracket, the bearings, the bearing races, and other drive components when the balance bike is converted back to a pedal bike.

The unprotected frame openings are also unsightly and project an unfinished appearance which can be disconcerting to consumers who appreciate well-crafted products.

An additional problem with the unprotected openings of a homemade balance bike is that it leaves the bottom bracket vulnerable to being damaged in the event of an impact with another object. Bicycle frames (including bottom brackets) are typically made from thin metal tubes which form a strong, rigid and lightweight frame. In the unassembled state, the individual tubes are relatively weak, especially at the exposed ends. But when the ends of the tubes are welded together or finished with adequate hardware, they are much stronger and protected from impact. When a pedal bike is converted to a home made balance bike, most or all of the hardware is removed from the bottom bracket tube, thereby leaving it exposed and more vulnerable to damage.

Moreover, the bottom bracket is located on a part of the frame that is especially vulnerable to impact. This may be understood with reference to the homemade balance bike of FIG. 2 in a situation where a new rider is learning to ride on a sidewalk along a curb-lined street. If the rider accidentally steers off the sidewalk, over the curb, and onto the street, the bottom bracket 10 is likely to impact the curb and be damaged as the front tire drops down onto the street.

BRIEF DESCRIPTION OF THE DRAWINGS

FIG. 2 illustrates a prior art pedal bicycle that has been converted to a homemade balance bike.
FIGS. 14, 15 and 16 are a perspective view, an outside elevation view, and an inside elevation view, respectively of a protective insert according to the inventive principles of this patent disclosure.
FIG. 17 is a cross-sectional view of a protective insert according to the inventive principles of this patent disclosure.
FIGS. 26 and 27 are cross-sectional views of the inserts shown in FIG. 20.

DETAILED DESCRIPTION

Figure 1:
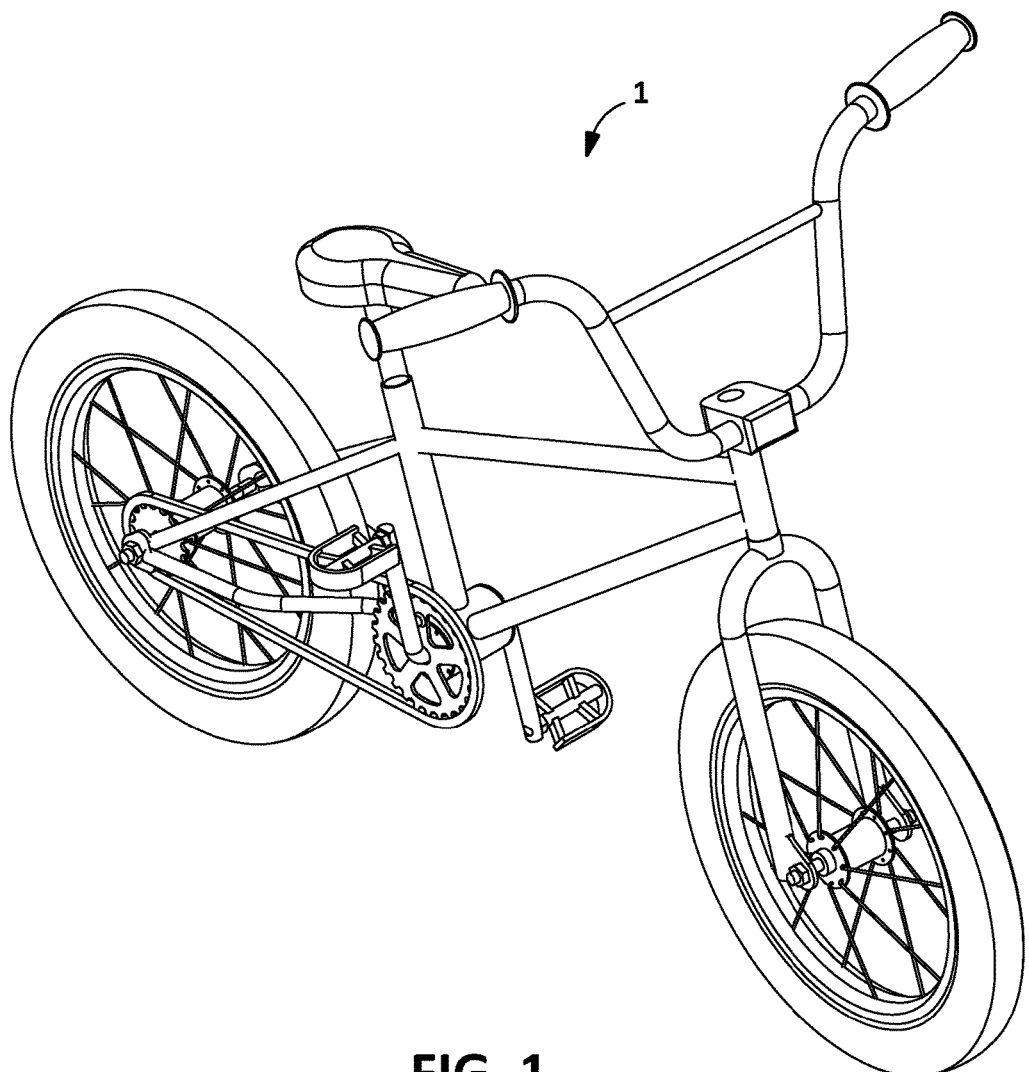
FIG. 1 illustrates a prior art pedal bicycle.
Figure 3:
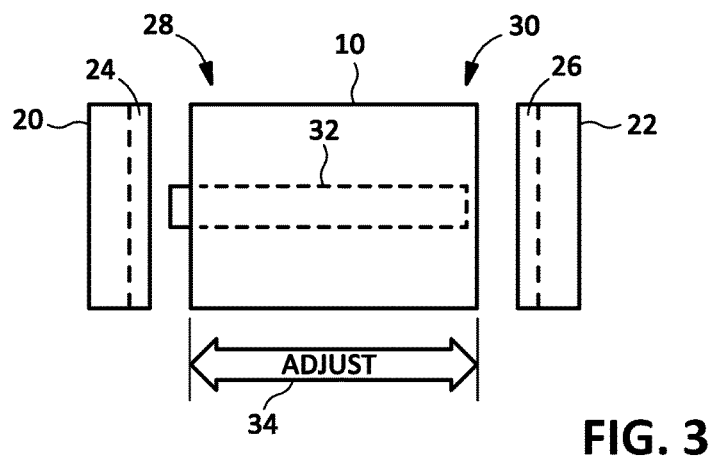
FIG. 3 illustrates an embodiment of a system for converting a pedal bike to a balance bike according to the inventive principles of this patent disclosure.

FIG. 3 is an exploded schematic view of a system for converting a pedal bike to a balance bike according to some inventive principles of this patent disclosure. The system of FIG. 3 includes a first protective insert 20 having an interface 24 that is adapted to engage one end 28 of the bottom bracket 10 of a pedal bicycle. A second protective insert 22 has an interface 26 which is adapted to engage the other end 30 of the bottom bracket 10.

A connector 32 is adapted to connect the first protective insert 20 to the second protective insert 24, thereby securing the first and second protective inserts to the bottom bracket 10. The connector 32 is adapted to adjust the distance between the first and second protective inserts, thereby accommodating variability in the width of the bottom bracket as illustrated by arrow 34. This enables the conversion system to be used with different models of pedal bikes from different manufacturers, all of which may have bottom brackets with different widths.

Figure 4:
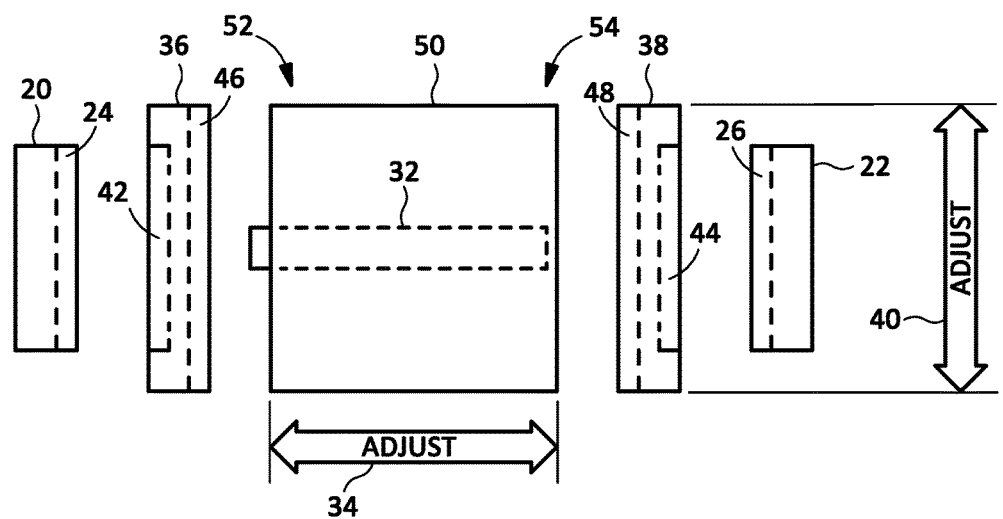
FIG. 4 illustrates another embodiment of a system for converting a pedal bike to a balance bike according to the inventive principles of this patent disclosure.

FIG. 4 is an exploded schematic view of another system for converting a pedal bike to a balance bike according to some inventive principles of this patent disclosure. The system of FIG. 4 includes all of the components of the system of FIG. 3, and further includes adapters 36 and 38 which enable the system to be used with a second bicycle that has a bottom bracket with openings having a different diameter (shown by arrow 40) than the first bike.

The first adapter 36 has a first interface 42 adapted to engage the interface 24 of the first protective insert 20, and a second interface 46 adapted to engage a first end 52 of the bottom bracket 50 on a second bicycle which is larger than the bottom bracket 10 of the first bicycle of FIG. 3.

The second adapter 38 has a first interface 44 adapted to engage the interface 26 of the second protective insert 22, and a second interface 48 adapted to engage the bottom bracket 50 at a second end 54 opposite the first end 52.

Depending on the implementation details, many of which are discussed in the context of the additional embodiments described below, the embodiments of FIGS. 3 and 4 may address some or all of the problems with homemade balance bikes discussed above. For example, some implementations may protect the bottom bracket from contamination, provide structural reinforcement to resist distortion from impact, and at the same time provide an attractive finished appearance. Some implementations may concentrate primarily on structural reinforcement, while others may primarily address issues relating to contamination. Yet other implementations may only address the aesthetics of covering the openings at the ends of a bottom bracket.

The protective inserts 20 and 22 may engage the bracket directly or through various other components that are part of the conversion system (e.g., gaskets, other adapters, etc.), or through other components that were originally part of the pedal bike (e.g., bearings, races, etc.). The inserts 20 and 22 may be positioned completely inside the end of bracket, partially inside and partially outside the bracket, or may only engage the outer face of the bracket end.

The system of FIGS. 3 and 4 may include additional components, and some components such as the connector may be omitted in some embodiments. The conversion system may be distributed as a kit which may include multiple adapters for different sizes and styles of bottom brackets, as well as components such as tools or disassembly or installation aids that do not remain on the bike after conversion, or components that may be used for converting the balance bike back to a pedal bike.

Figure 5:
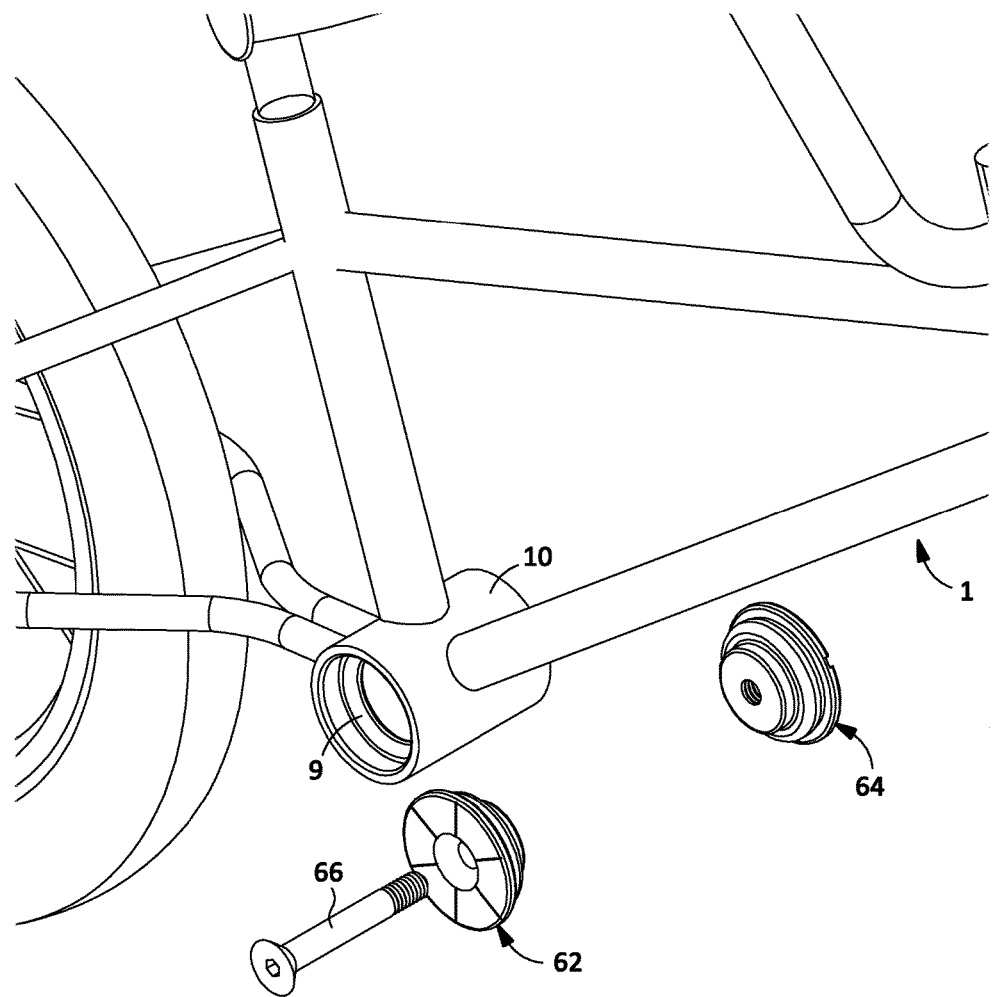
FIGS. 5 and 6 illustrate a first detailed embodiment of a system for converting a pedal bike to a balance bike according to the inventive principles of this patent disclosure.
Figure 6:
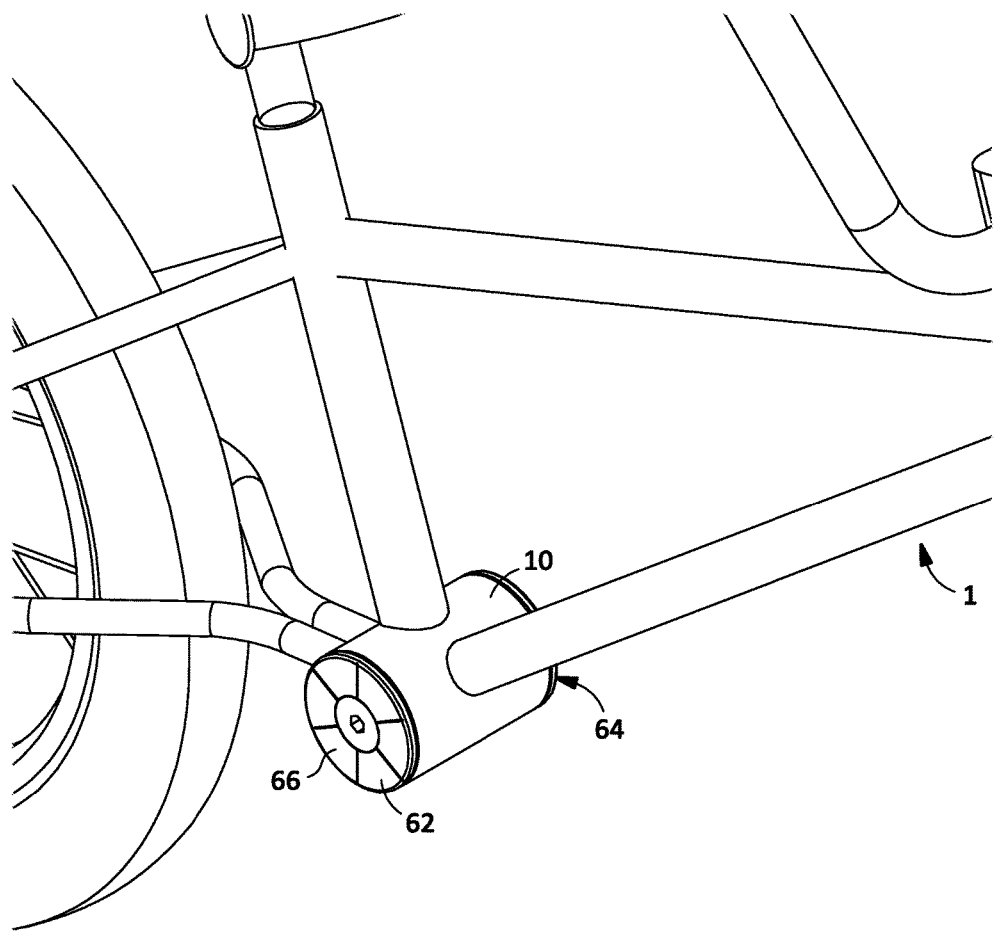

FIGS. 5 and 6 illustrate a first detailed embodiment of a system for converting a pedal bike to a balance bike according to the inventive principles of this patent disclosure. In this example, the pedal bike is a 12-inch children's bicycle which typically has a relatively small bottom bracket with correspondingly small end openings, but the inventive principles are not limited to these details. The system of FIGS. 5 and 6 may accommodate variability in the width of the bottom bracket 10 as in the embodiment of FIG. 3.

Referring to FIG. 5, the bike 1 has had all of the drive components removed from the bottom bracket 10 except for bearing races 9 as described above with reference to FIG. 2. It is common to leave the outer bearing races (or cups) 9 in the bottom bracket 10 because they may be difficult to remove or even permanently attached or formed integral with the bracket. The removed drive components are replaced with first and second protective inserts 62 and 64, respectively, and secured to the bottom bracket with a connector 66. In this embodiment, the connector 66 is implemented with a flat head screw that passes through a countersunk through-hole in the first protective insert 62 and threads into a blind threaded hole in the second protective insert 64.

FIG. 6 shows the protective inserts 62 and 64 fully installed on the bottom bracket with screw 66 tightened to hold the inserts securely in place. This embodiment may protect the bottom bracket from both contamination and structural damage while still providing a finished appearance as described in more detail below.

Figure 7:
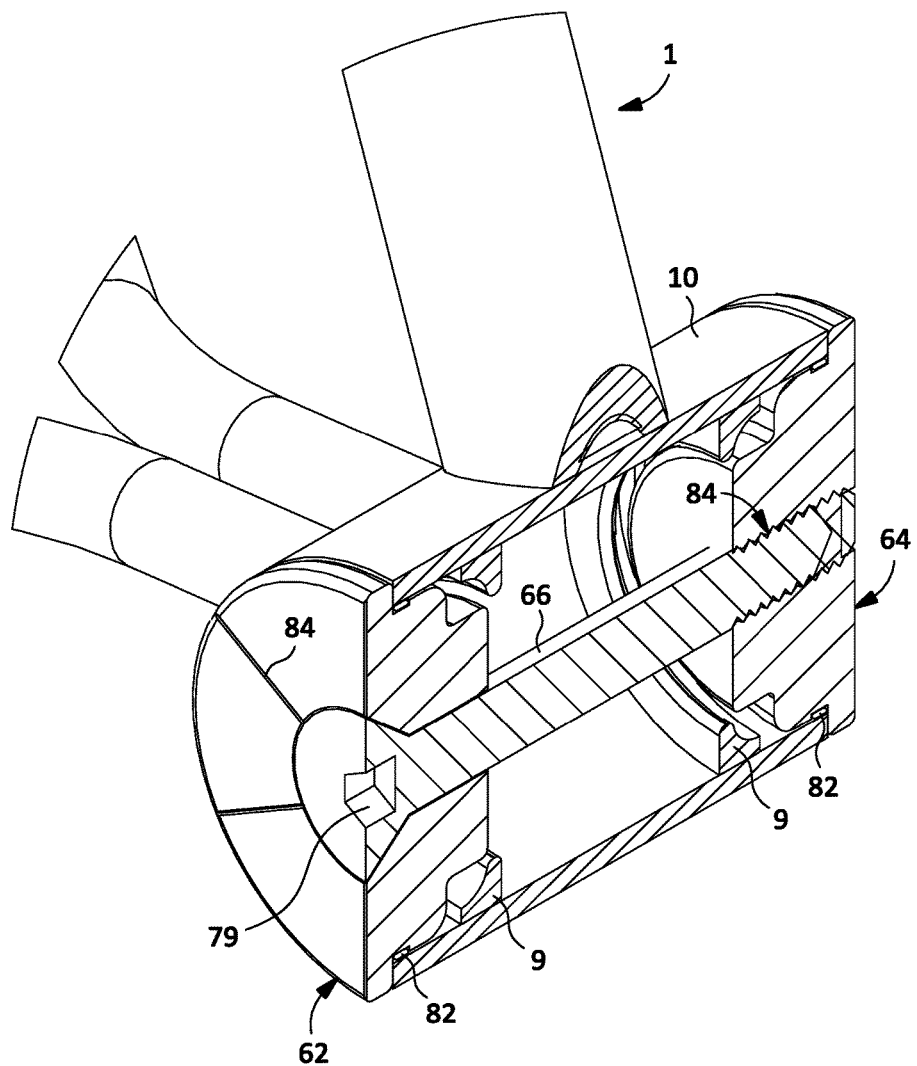
FIG. 7 is a cut-away perspective view of the fully installed components shown in FIG. 6.
Figure 8:
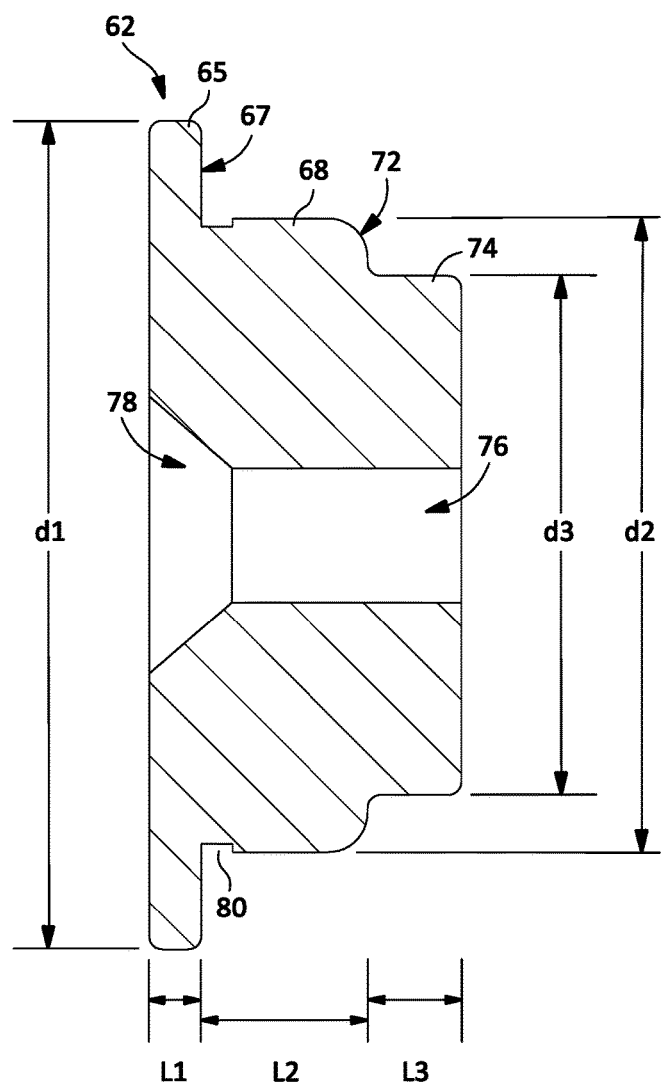
FIGS. 8 and 9 are cross-sectional views of a protective insert according to the inventive principles of this patent disclosure.
Figure 9:
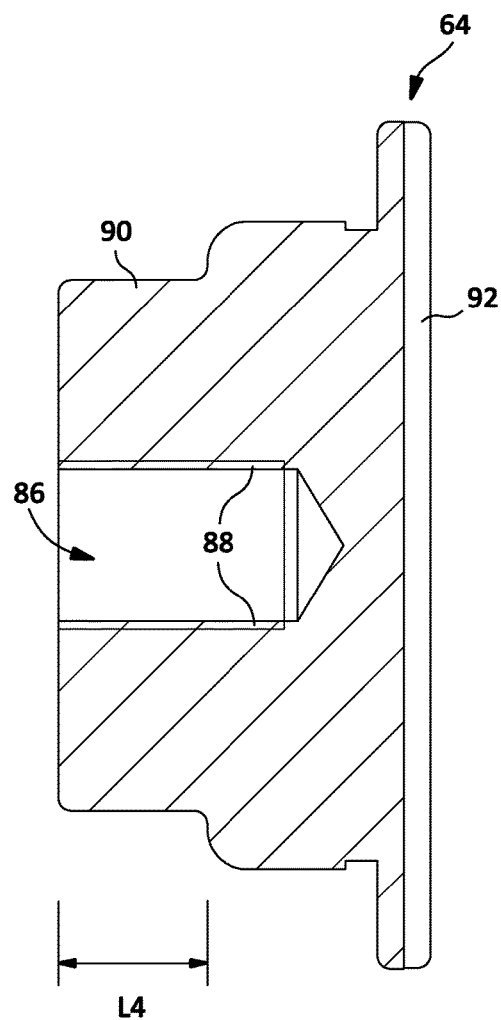

The first and second protective inserts 62 and 64 will now be described in more detail with reference FIGS. 7-9. Additional views are provided in FIGS. 10-19 and which are discussed further below. FIG. 7 is a cut-away perspective view of the fully installed components shown in FIG. 6. FIG. 8 is a cross-sectional view of insert 62 taken along line A-A in FIG. 16, and FIG. 9 is a cross-sectional view of insert 64 taken along line A-A in FIG. 12.

Referring to FIGS. 7 and 8, insert 62 has a profile that forms an interface that engages directly with the bottom bracket 10. The insert 62 is machined from a solid rod of aluminum alloy into a series of three cylinders of cascading size. The first cylinder 65 is essentially a disk having a relatively short length L1 and a diameter d1 that approximates the outer diameter of the bottom bracket 10. The inside surface of the disk forms a shoulder 67 that acts as a stop when the protective insert 62 is fully engaged with the bottom bracket 10.

The second cylinder 68 has a length L2 and a diameter d2 that creates a close fit between the second cylinder 68 and the inside of the bottom bracket 10 as indicated by arrow 70 in FIG. 7. The fit is preferably loose enough that the insert 62 does not become wedged inside the bottom bracket 10 and become difficult to remove, but tight enough so that, in the event of an impact, the bottom bracket 10, undergoes little or no deformation before it receives radial support from the second cylinder 68 to prevent or minimize further deformation.

The second cylinder 68 has a rounded shoulder 72 that helps center the protective insert 62 as it is being inserted into the bottom bracket 10. The rounded shape of shoulder 72 may also accommodate the convex shape of the bearing race 9 in bikes where the positioning of the insert 62 causes the shoulder of second cylinder 68 to end up close to or up against the bearing race 9.

The third cylinder 74 has a length L3 and a diameter d3 that provides clearance between the third cylinder 74 and the inside diameter of the bearing race 9 on bikes in which the bearing races 9 are positioned relatively close to the opening of the bottom bracket 10. The stepped profile of the second and third cylinders 68 and 74 along with the rounded shoulder 72 create a profile that may cause the protective insert 62 to be self-centering and provide a fit that both protects the bearing races 9 from damage and keeps the insert 62 from vibrating in the bottom bracket 10.

A through hole 76 and countersink 78 are sized to accept a socket flat head cap screw 66 as shown in FIG. 7. The screw 66 has a hex recess 79 to accept a hex key for tightening while still providing a safe, smooth, clean, finished appearance free of sharp edges and protrusions.

A groove 80 is formed in the second cylinder 68 where it meets the first cylinder 65. The groove 80 accommodates an O-ring 82 which provides an enhanced seal between the protective insert 62 and the bottom bracket 10 as shown in FIG. 7.

A series of grooves 84 are formed in the outside face of the protective insert 62 giving the appearance of spokes radiating from the center. These grooves 84 have a v-shaped profile and serve a decorative function, but they may also serve a gripping function during installation and removal by serving as connection points for a spanner wrench. Other edges not specifically discussed may be rounded, chamfered, or otherwise eased for safety, ease of installation, aesthetics, etc.

Referring to FIGS. 7 and 9, the second protective insert 64 has the same general profile and dimensions as the first protective insert 62, and features that are common to both inserts are indicated with the same reference numbers which may be omitted from FIG. 9 for simplicity. However, rather than having a through hole, the second protective insert 64 has a blind hole 86 with female threads 88 to engage the male threads on the flat head cap screw 66 as shown by arrow 89 in FIG. 7.

The third cylinder 90 of the second protective insert 64 has a length L4 that is longer than the length L3 of the third cylinder 74 of first protective insert 62. This enables the screw 66 to engage the threads on the second protective insert 64 over a longer distance, thereby providing a greater range of adjustability to accommodate variances in the width of bottom brackets on different makes and models of pedal bicycles.

Figure 10:
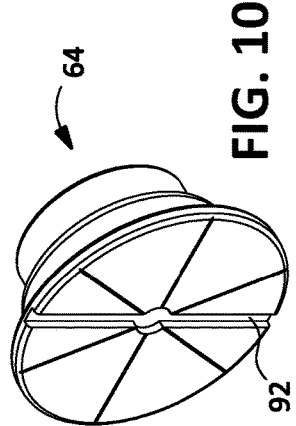
FIGS. 10, 11 and 12 are a perspective view, an outside elevation view, and an inside elevation view, respectively of a protective insert according to the inventive principles of this patent disclosure.

Also visible in FIG. 9 is a slot 92 which can be seen in more detail in FIG. 10. This slot has a rectangular cross-section which provides better gripping for a spanner wrench or other tool during installation and removal.

Figure 11:
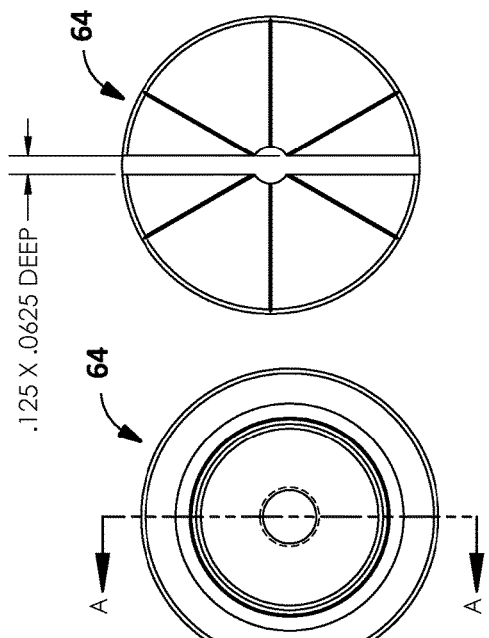
Figure 12:
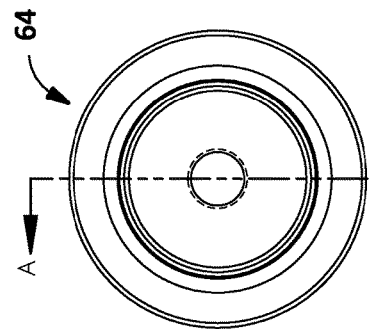
Figure 13:
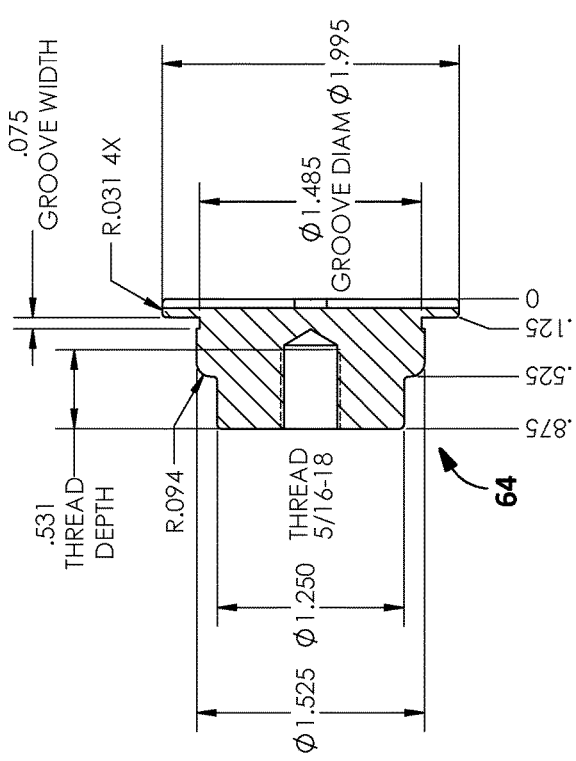
FIG. 13 is a cross-sectional view of a protective insert according to the inventive principles of this patent disclosure.

FIGS. 10-19 provide some additional views and details of the embodiment of FIGS. 5-9. FIGS. 10, 11 and 12 are a perspective view, an outside elevation view, and an inside elevation view, respectively of the second protective insert 64. FIG. 13 is a cross-sectional view taken along line A-A in FIG. 12 and provides some example dimensions that have been found to provide good engagement between the insert 64 and bottom bracket 10 on a wide range of children's bicycles (especially 12-inch bikes) available in the U.S.

FIGS. 14, 15 and 16 are a perspective view, an outside elevation view, and an inside elevation view, respectively of the first protective insert 62. FIG. 17 is a cross-sectional view taken along line A-A in FIG. 16 and again provides some example dimensions. The shapes and dimensions shown in FIGS. 13 and 17 are intended to accommodate a 5/16-18 by 1¾ flat socket cap screw 66.

Figure 19:
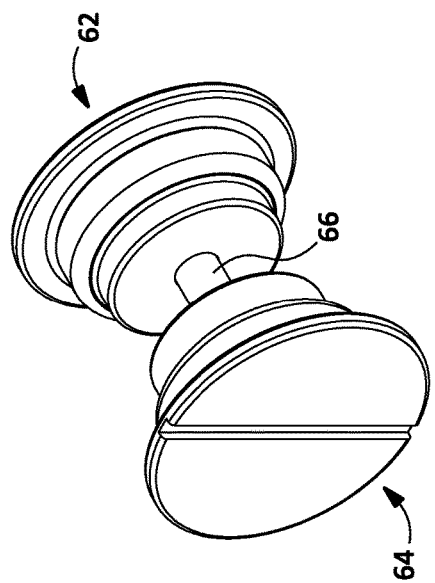
FIG. 19 is a perspective view of a conversion kit shown fully assembled according to the inventive principles of this patent disclosure.
Figure 18:
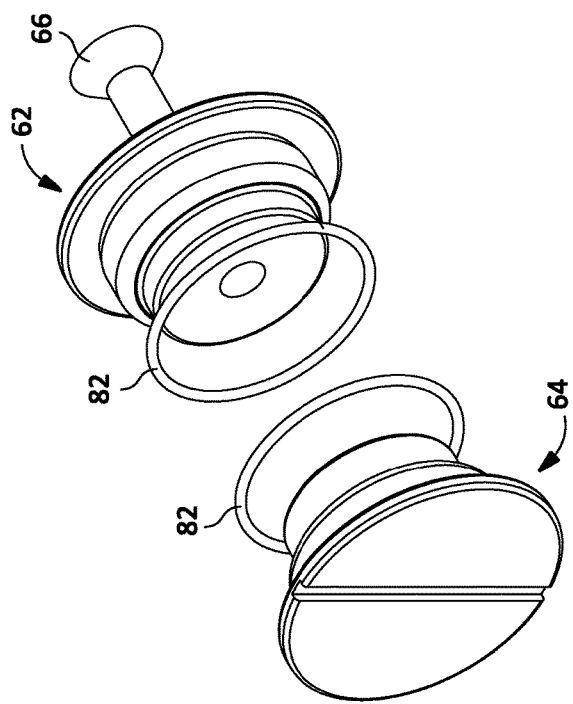
FIG. 18 is an exploded perspective view of a balance bike conversion kit according to the inventive principles of this patent disclosure.

FIG. 18 is an exploded perspective view of the first and second protective inserts 62 and 64, O-rings 82 and cap screw 66, which collectively may be referred to as a conversion kit. FIG. 19 is a perspective view of the conversion kit shown fully assembled.

The details described above are by way of example only, and may be changed in myriad ways without departing from the inventive principles. For example, the groove 80 and O-ring 82 may be omitted from each insert and replaced by a flat washer made of rubber, paper, etc., positioned between the shoulder 67 and the outer edge 94 of the bottom bracket. Alternatively, no separate sealing component may be included, and the surface-to-surface interface between the shoulder 67 and the outer edge 94 of the bottom bracket 10 may provide adequate sealing in some applications.

In other implementations, the first cylinder 65, along with its corresponding shoulder 67 may be omitted entirely, in which case the shoulder 72 of the second cylinder 68 insert may stop against the bearing race 9 when the assembly is tightened down with screw 66. In this configuration, the close fit between the second cylinder 68 and the inside surface of the bottom bracket 10 may provide adequate sealing against contamination. As another variation, the diameter of the first cylinder 65 may be reduced so it is the same diameter as, or slightly larger than, the second cylinder 68 with the groove 80 and O-ring 82 retained so the O-ring is drawn further into the bottom bracket and provides additional sealing as the inserts are drawn against the bearing races during installation.

With the example bike illustrated in FIGS. 5 and 7, the bearing races 9 are shown as separate components that are located inside the bottom bracket 10 a certain distance back from outer edge 94 of the bottom bracket. With other bikes, however, the bearing races may be fabricated as part of components known as cups that are pressed into the ends of the bottom bracket. Each cup typically has a flange that stops against the outer edge 94 of the bottom bracket to position the cup in the bracket. With such a bike, the cups are typically difficult to remove and may be left in place and considered part of the bottom bracket. Alternatively, the cups may be removed. Depending on the specific bike manufacturers and models, the size and shape of the interface of a single protective insert design may adequately engage bikes both with and without cups. With other bike manufacturers and models, however, it may be preferable to provide protective inserts with different interfaces.

As further examples of possible variations to the embodiment described above with respect to FIGS. 5-19, the rounded shoulders 72 may be eliminated or chamfered, the third cylinder 74 may be omitted, the blind hole 86 may be a through-hole, a socket head cap screw or hex head cap screw may be used, in which case a counterbore may be substituted for the countersink 78, or a completely different types of screw or connector may be used, etc.

Aluminum alloy may be a good choice of material because it is lightweight, easy to machine, rigid and sturdy which helps prevent distortion of the bottom bracket and bearing races in the event of an impact with another object (from riding, or dropping, etc.). However, other rigid materials, such as steel, hard plastic, composite materials, etc., may be utilized. In embodiments where structural support for the bottom bracket is not a concern, flexible materials such as rubber or soft plastics may be used in which case the O-ring may be omitted because the entire insert may provide a sealing effect.

Figure 20:
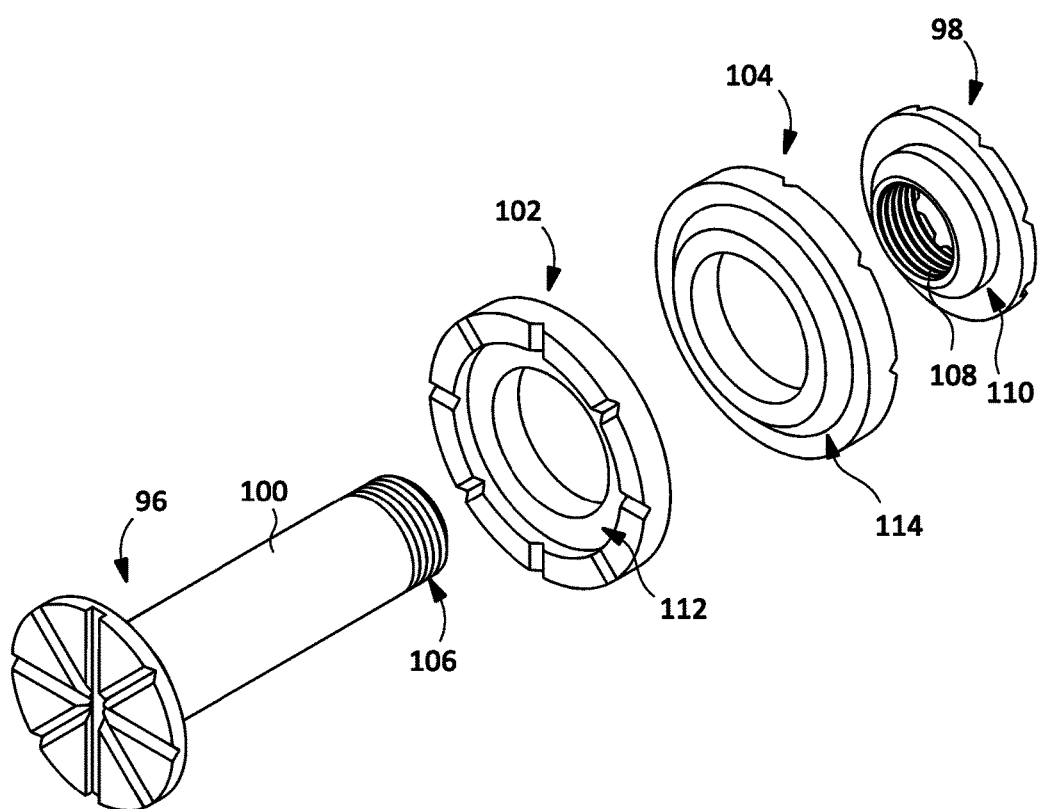
FIG. 20 illustrates a second detailed embodiment of a system for converting a pedal bike to a balance bike according to the inventive principles of this patent disclosure.

FIG. 20 illustrates a second detailed embodiment of a system for converting a pedal bike to a balance bike according to the inventive principles of this patent disclosure. The system of FIG. 20, which may be referred to as a multi-fit system, may accommodate variability in both the width and the diameter of the bottom bracket of a pedal bike as in the embodiment of FIG. 4.

The system includes first and second protective inserts 96 and 98 and a connector 100 that is integral with the first insert 96. The first and second inserts each include an interface 110 (only visible on the second insert 98 in this view) that is adapted to engage an end of the bottom bracket.

The connector 100 includes a male threaded portion 106 that engages female threads 108 in the second insert 98 to secure the inserts to the bottom bracket of a bicycle and accommodate variability in the width of the bottom bracket.

The system also includes two ring-shaped adapters 102 and 104 that may be used to install the inserts on a bicycle with a wider diameter bottom bracket. Each of the adapter rings 102 and 104 includes a first interface 112 on its outer side (only visible on the first adapter 102 in this view) that engages the interface of the corresponding protective insert. Each of the adapter rings 102 and 104 also includes a second interface 114 on its inner side (only visible on the second adapter 104 in this view) that engages an end of a larger diameter bottom bracket. Thus, the adapter rings 102 and 104 may be omitted when the system is installed on a smaller bottom bracket, but included when it is installed on a larger bottom bracket.

Figure 21:
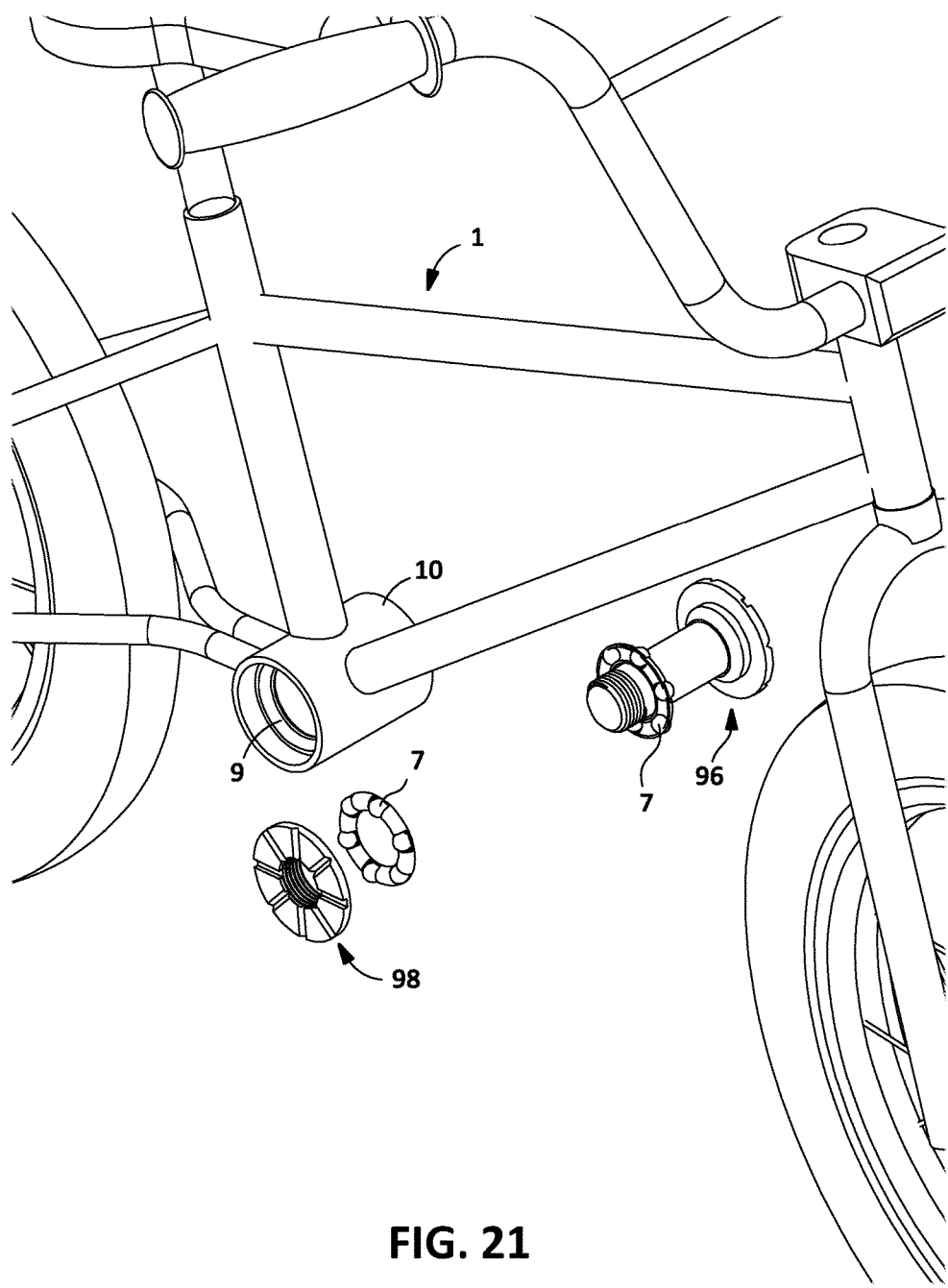
FIGS. 21 and 22 are an exploded view and an assembled view, respectively, of the system of FIG. 20 configured for use on a bike with a relatively small bottom bracket.
Figure 22:
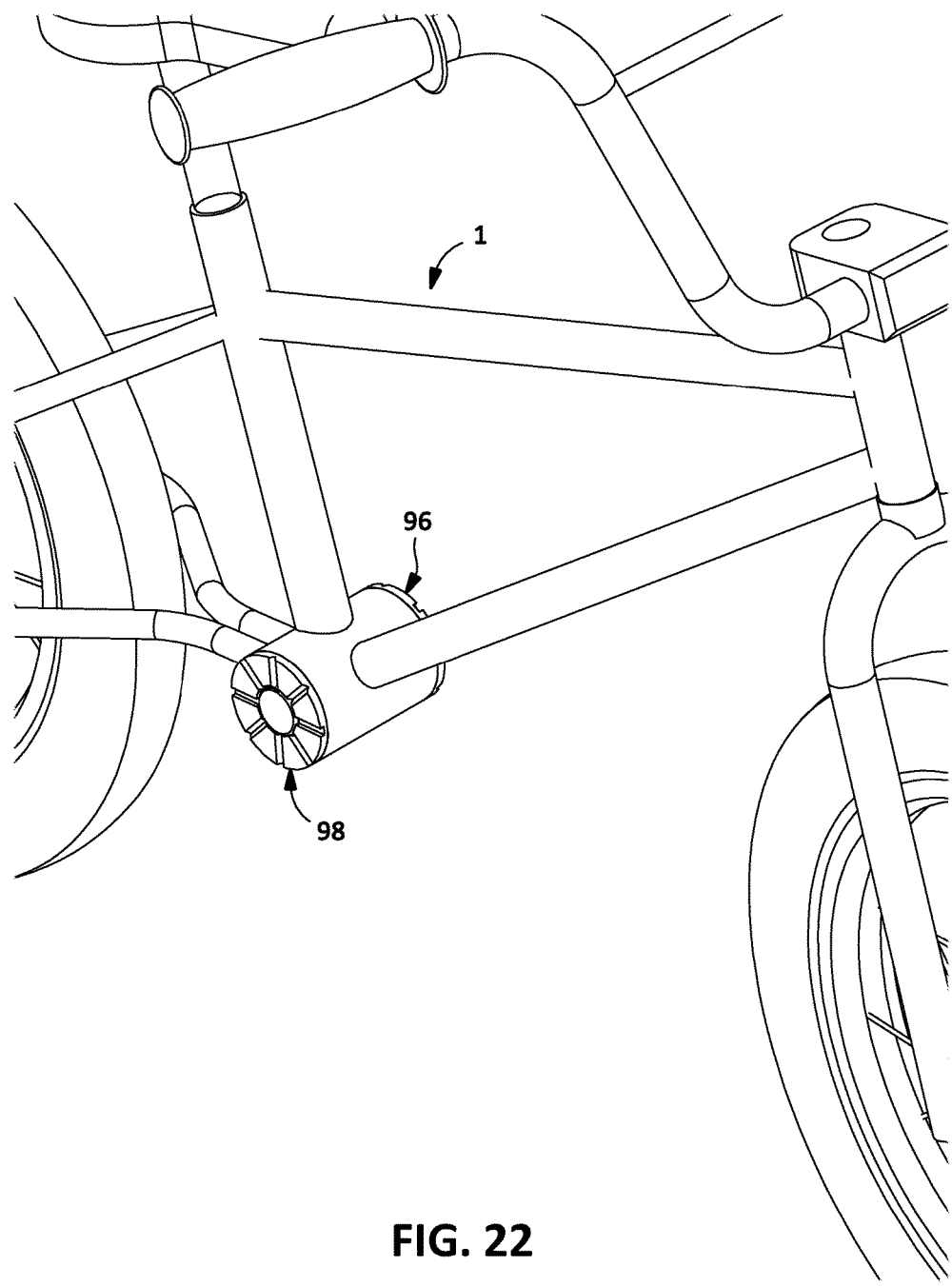

Another feature of the embodiment of FIG. 20 is that it is designed to retain the bearings 7 of a pedal bike inside the bottom bracket when it is converted to a balance bike. This affords the user the option of storing and thereby protecting the bearings in the bottom bracket. This is illustrated in FIG. 21 which is an exploded view of protective inserts 96 and 98, connector 100 and bearings 7 prior to assembly on the bottom bracket 10 a smaller (e.g., 12 inch) children's bike 1. FIG. 22 shows the protective inserts 96 and 98 fully installed on the bottom bracket 10 with connector 100 tightened to hold the inserts securely in place. In this configuration, the adapter rings 102 and 104 are not needed.

Figure 23:
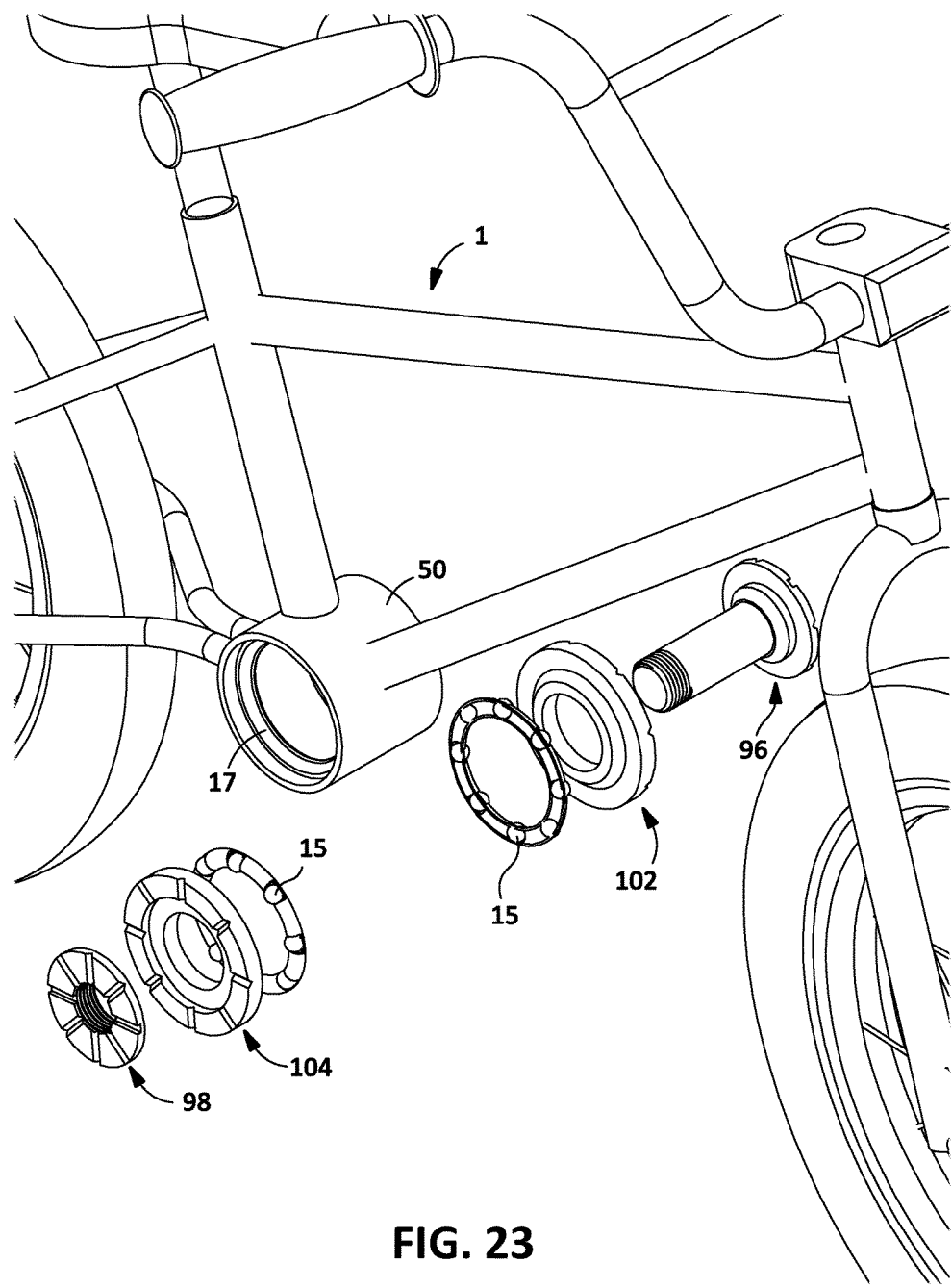
FIGS. 23 and 24 are an exploded view and an assembled view, respectively, of the system of FIG. 20 configured for use on a bike with a relatively large bottom bracket.
Figure 24:
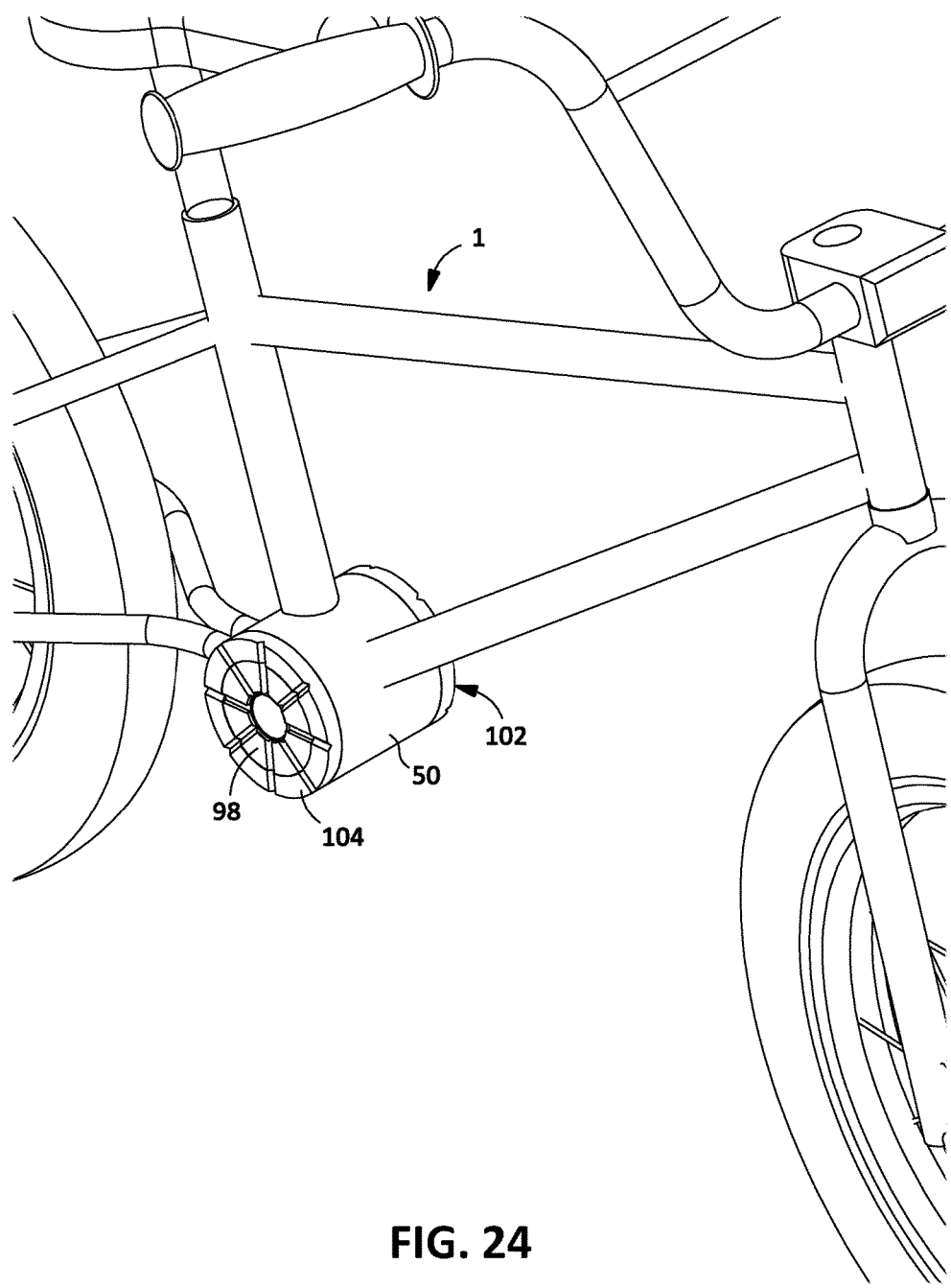

FIG. 23 illustrates the use of the system of FIG. 20 on a larger (e.g., 16 inch) children's bike 13 where the first and second adapter rings 102 and 104 are positioned between the protective inserts 96 and 98 and the larger bottom bracket 50. The larger bearings 15 and bearing inner races 17 are visible in this view. FIG. 24 shows the components fully installed on the bottom bracket 50 with connector 100 tightened to hold the inserts 96 and 98 and adapter rings 102 and 104 securely in place.

Figure 25:
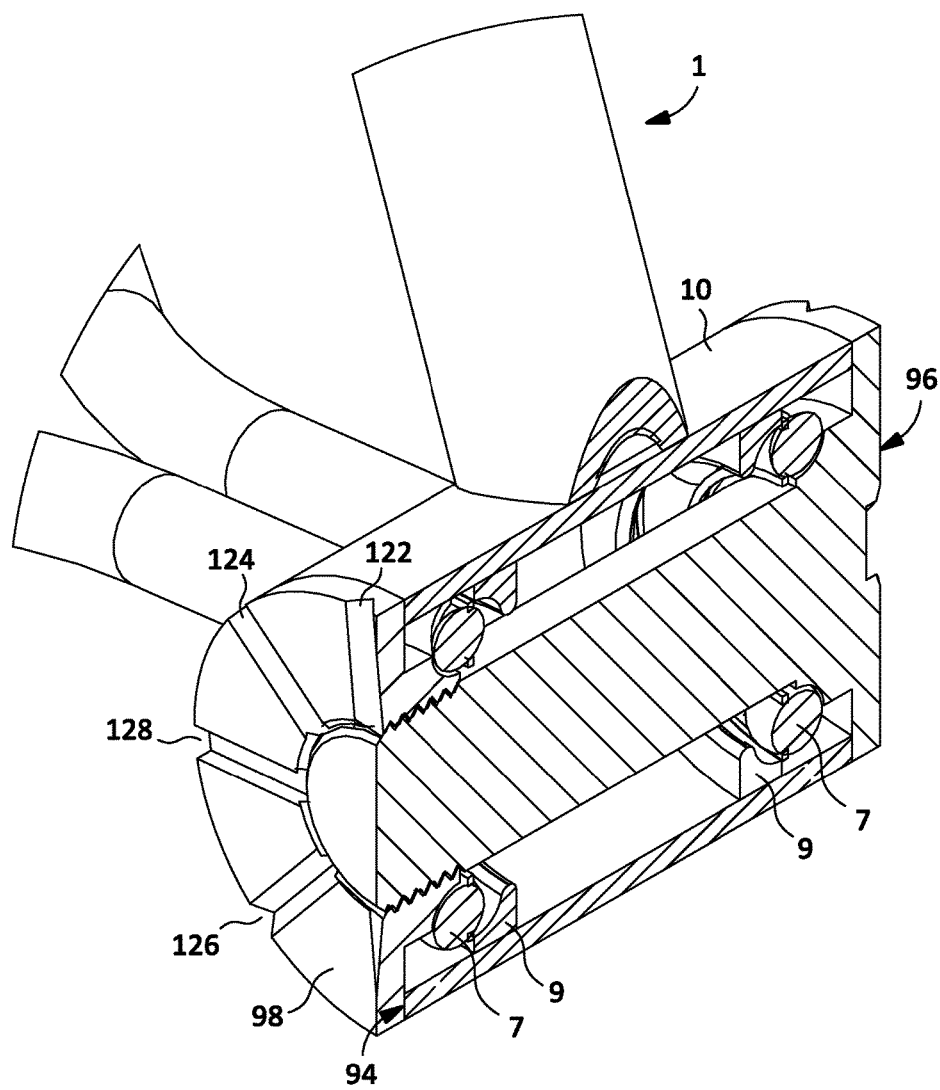
FIG. 25 is a cut-away perspective view of the fully installed components shown in FIG. 22.

The first and second protective inserts 96 and 98 will now be described in more detail with reference to FIGS. 25-27 where FIG. 25 is a cut-away perspective view of the fully installed components shown in FIG. 24, FIG. 26 is a cross-sectional view of insert 96, and FIG. 27 is a cross-sectional view of insert 98.

The second protective insert 98 has an interface that includes a disk-shaped portion 112 with a flat inner surface 114 forming a shoulder that seats against the outer edge 94 of bottom bracket 10. The disk-shaped portion 112 has a length L1 and a diameter d1 that preferably matches the outside diameter of bottom bracket 10. The interface also includes a cylindrical portion 116 having a diameter d2 and a length L2 that extends into the end of the bottom bracket 10. A cone-shaped portion 118 of the interface has a concave race surface 120 that engages the ball bearing 7 which is restrained between the cone portion 118 and one of the bearing inner races 9.

The second protective insert 98 also include a female threaded through-hole 108, as well as radially aligned grooves 122, 124, 126 and 124 which are most visible in FIG. 25. Groove 128 has a rectangular cross-section which may be readily engaged by a spanner wrench for installation and removal, while the other grooves have a V-shaped cross-section and are intended primarily for ornamentation.

The first protective insert 96 has one end with a cross-sectional profile that is essentially the same size and shape as the profile of the second protective insert 98 and engages the other end of the bottom bracket 10. The integral connector 100 forms a shaft that extends from first protective insert 96 and terminates in a male threaded portion 106 that engages the female threaded through-hole 108 of the second protective insert 98 when the inserts are installed on the bottom bracket 10. The shaft preferably has a diameter d4 that provides a close fit with the ball bearing 7 so the shaft is self-aligning. During assembly, one of the ball bearings can be slipped over the shaft of the first protective insert 96 which is then inserted into one end of the bottom bracket 10. The other ball bearing is then slipped into the other end of the bottom bracket 10 and over the threaded portion 106 of the shaft. The second protective insert 98 is then threaded onto the threaded portion 106 of the shaft 100 and either or both of the inserts 96 and 98 are rotated until the inserts are securely seated against the end faces of the bottom bracket as shown in FIG. 25.

A benefit of the embodiment of FIG. 25 is that it may enclose the ball bearings in a clean, dry and safe environment while the bike is being used as a balance bike. The ball bearings tend to be the most fragile of the pedal bike drive components, and they are vulnerable to dirt, moisture, physical damage and misplacement when removed from the bottom bracket. The bearing retainers are typically made of a relatively soft metal that is easily bent if dropped, stepped on, or otherwise mishandled. The ball bearings are protected from these hazards, however, when enclosed inside the bottom bracket by the protective inserts.

A further benefit of the embodiment of FIG. 25 is that it may enable the ball bearings to provide physical support to the bottom bracket. If the protective inserts 96 and 98 are sized and positioned so the ball bearings 7 are held securely between the cone-shaped portions 118 and the bearing outer races 7, the ball bearings may provide radial support to the bottom bracket 10 while the bike is being used as a balance bike. Although the bearings 7 tend to be fragile in the unassembled state, when installed between race surfaces they can bear a heavy radial load which is their intended function.

Figure 28:
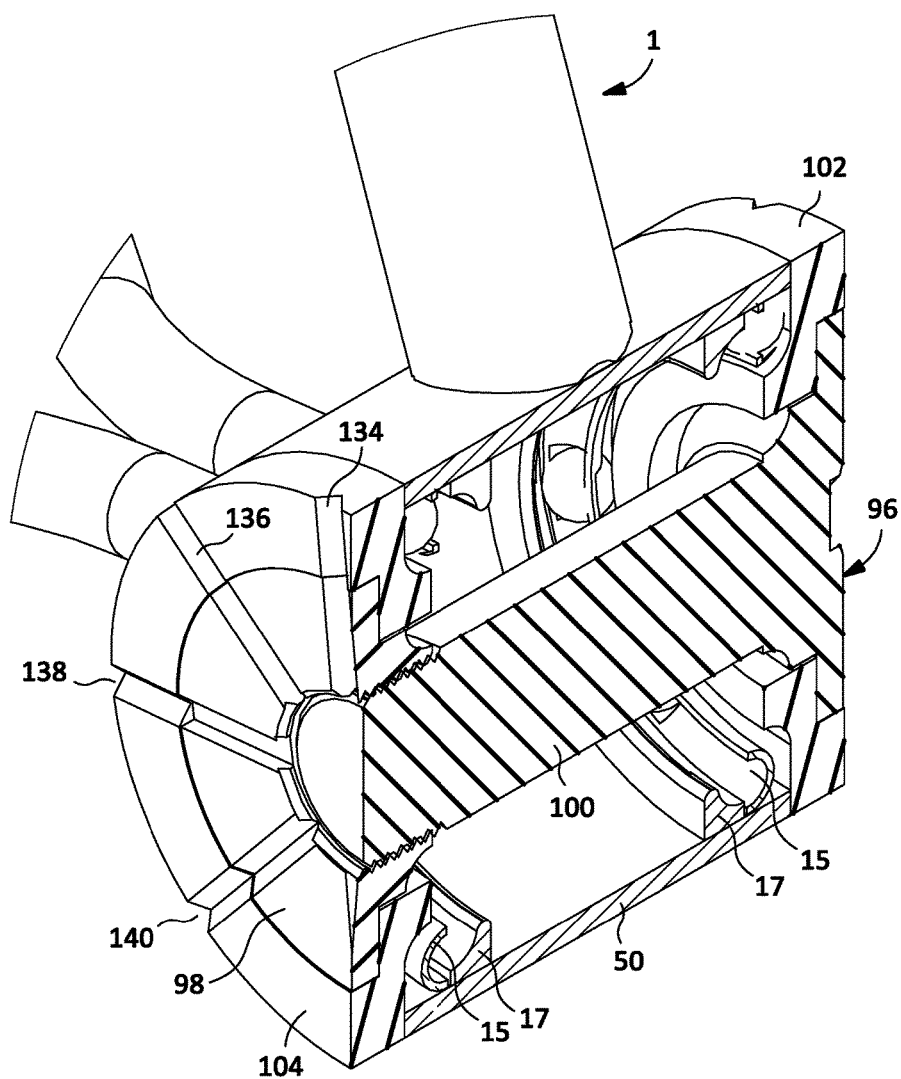
FIG. 28 is a cut-away perspective view of the fully installed components shown in FIG. 24.
Figure 29:
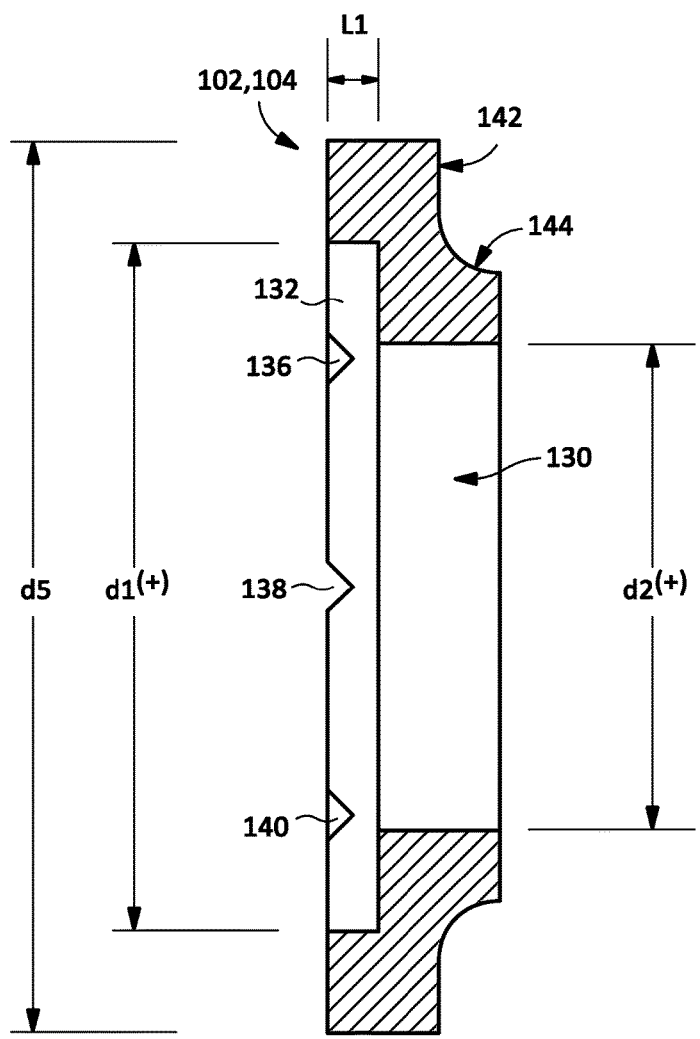
FIG. 29 is a cross-sectional view of the adapter rings shown in FIG. 20.

The first and second adapter rings 102 and 104 will now be described in more detail with reference to FIGS. 28-29 (and FIGS. 26 and 27) where FIG. 28 is a cut-away perspective view of the fully installed components shown in FIG. 24, and FIG. 29 is a cross-sectional view of adapter rings 102 and 104. The first and second protective inserts 96 and 98 and integral connector 100 are the same as in FIGS. 25-27.

The first and second adapter rings 102 and 104 may be manufactured as identical components. Each has an outer diameter d5 that preferably matches the outer diameter of the bottom bracket 50. Each adapter ring includes a through-hole 130 having a diameter $d2^{(+)}$ that is slightly larger than the diameter d2 of the cylindrical portion 116 of the protective inserts 96 and 98. The through hole has a counterbored portion 130 on the outer side having a depth L1 and a diameter $d1^{(+)}$ that is slightly larger than the diameter d1 of the disk-shaped portion 112 of the protective inserts 96 and 98. These dimensions enable the outer face of the protective inserts 96 and 98 to sit flush with the outer faces of the adapter rings 102 and 104 when installed on the bottom bracket 50 as shown in FIGS. 28 and 24.

The counterbored portion 130 forms the first interface 112 of each adapter ring as shown in FIG. 20. The second interface 114 of each adapter ring includes a shoulder surface 142 that engages the outer edge of the bottom bracket 50 and a cone-shaped portion having a concave surface 144 that may engage the ball bearings 15.

Each adapter ring may also include radially aligned grooves 134, 136, 138 and 140 which may all have a V-shaped profile and which preferably align with the grooves 122, 124, 126 and 124 on each of the protective inserts 96 and 98.

All of the components of the system illustrated in FIGS. 20-29 may be machined from aluminum alloy. The first protective insert 96 and integral connector 100 may be machine from a single piece of metal, or the connector 100 may be formed separately and attached to the insert 96 by welding, press fitting into a hole, or any other suitable technique.

The details described above are by way of example only, and may be changed in myriad way without departing from the inventive principles. For example, the components may be fabricated from any other suitable material. The cone shaped portions may have straight rather than concave surfaces. The protective inserts and/or adapter rings may include an additional cylindrical portion that fits closely inside the bottom bracket to provide radial support to protect the bottom bracket from distortion. Washers or O-rings may be included between the inserts and/or adapter rings and bottom bracket and/or between inserts and adapter rings. The adapter rings may include an additional cylindrical portion to position the cone further into the bracket to engage the bearings.

The adapter rings have been described in the context of the multi-fit embodiment of FIGS. 20-29, but a similar arrangement may also be utilized with the first detailed embodiment of FIGS. 5-19.

Figure 30:
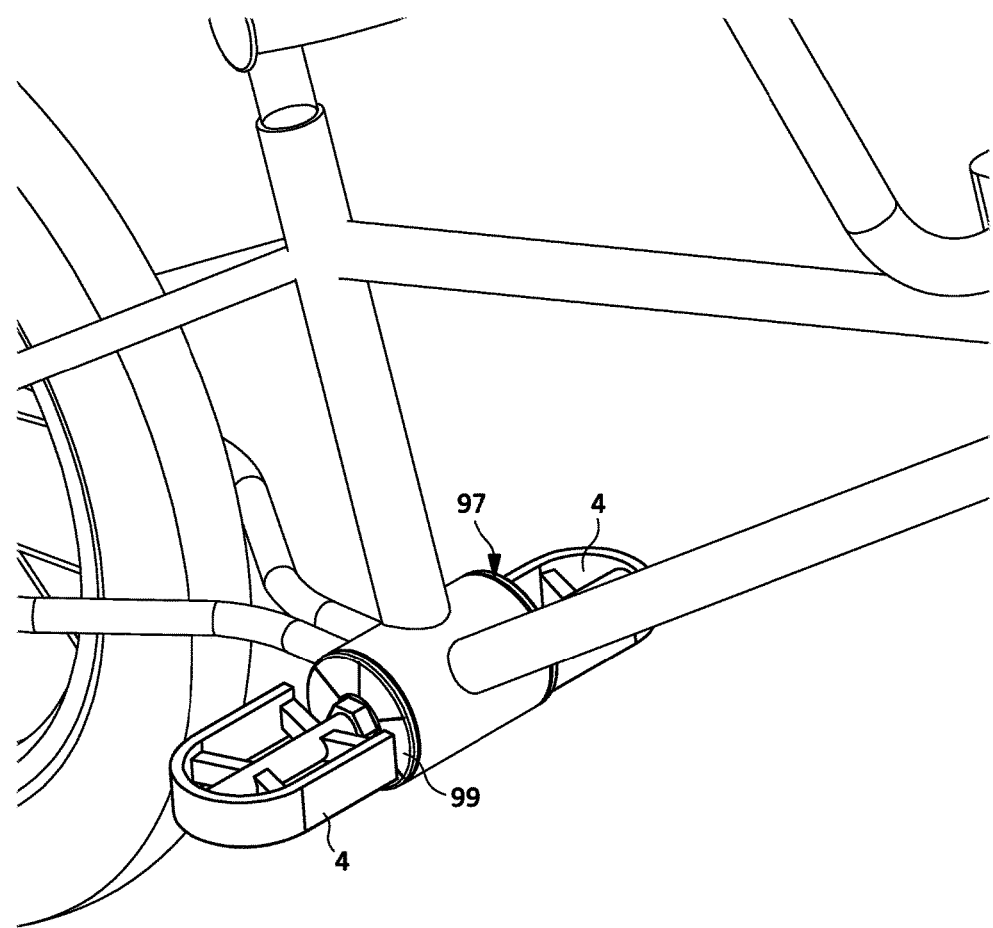
FIG. 30 illustrates an embodiment of a system for converting a pedal bike to a balance bike having foot rests according to the inventive principles of this patent disclosure.

Some additional inventive principles of this patent disclosure relate to the addition of foot rests to a balance bike conversion system. Removing the pedals and cranks from a pedal bike may reduce the distractions and complexity while learning to ride, but some riders may still prefer to have place to rest their feet, especially as their balance skills improve. FIG. 30 illustrates an embodiment of a system for converting a pedal bike to a balance bike having foot rests according to the inventive principles of this patent disclosure. The embodiment of FIG. 30 includes protective inserts 97 and 99 similar to inserts 96 and 98 shown in FIG. 22 but with attachment points for mounting the pedals 4 which were removed from the pedal bike as shown in FIG. 2. For example, the insert 97 with the integral connector may be drilled and tapped at either end to accept the right and left hand threads of the pedals. An advantage of this embodiment is that it makes use of components that are already available.

Figure 31:
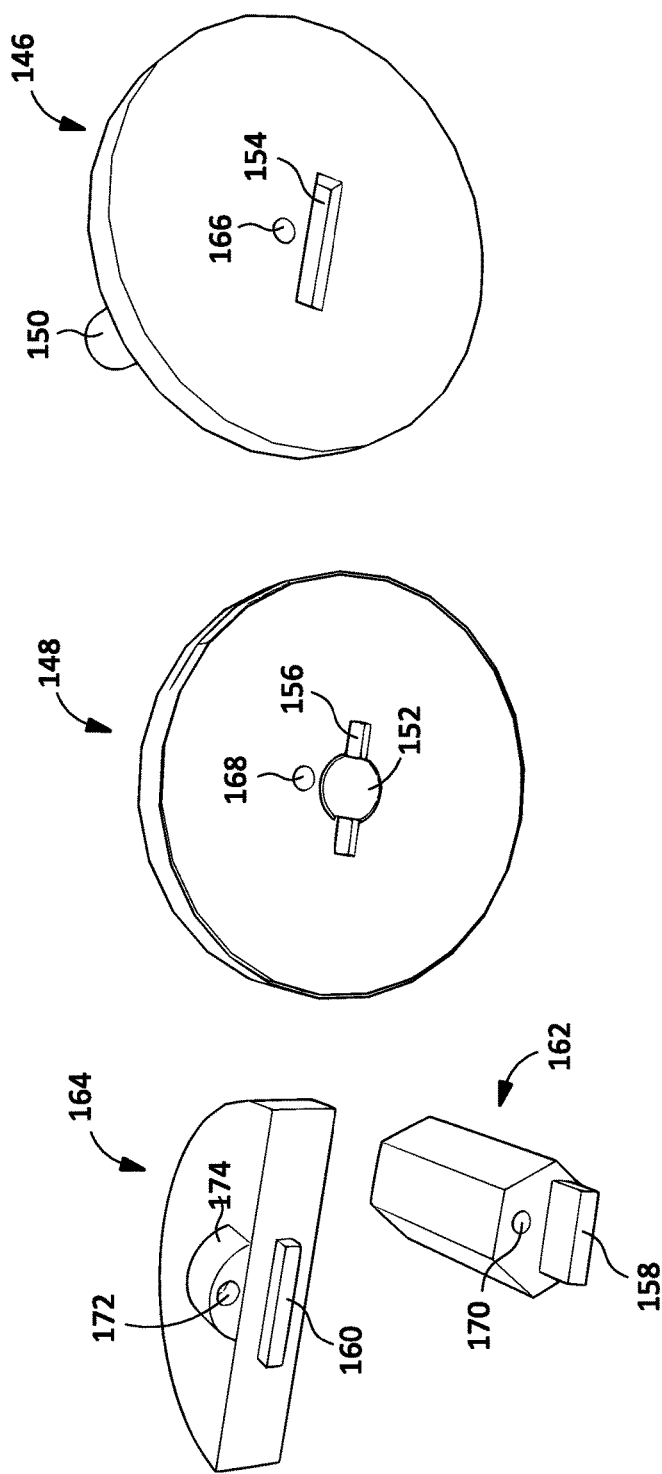
FIG. 31 illustrates another embodiment of a system for a pedal bike to a balance bike having foot rests according to the inventive principles of this patent disclosure.

FIG. 31 illustrates another embodiment of a system for a pedal bike to a balance bike having foot rests according to the inventive principles of this patent disclosure. The embodiment of FIG. 31 includes a first protective insert 146 having an integral connector 150, and a second protective insert 148 having a hole 152 adapted to receive the end of the connector 150. For example, the connector 150 and hole 152 may have matching male and female threads, respectively. The first and second inserts 146 and 148 each has a slot 154 and 156, respectively, adapted to receive a tab on a foot rest. One example foot rest 164 is formed as a semi-circular disk with a tab 160 disposed along the flat edge of the foot rest. The foot rest may be mounted to either of the protective inserts 146 and 148 by engaging the tab 160 with the slot on the foot rest. The footrest 164 includes a protrusion 174 having a hole 172 that aligns with either of the holes 166 or 168 on the first and second inserts 146 and 148 to enable the foot rest to be securely fastened to the insert with a screw or other suitable fastener Another example foot rest 162 is formed with more of a peg shape, in this example having a hexagonal cross-section. The foot rest 162 also includes a tab 158 and hole 170 to enable it to be fastened to the insert with a screw or other suitable fastener.

Either of the example foot rests may be fabricated from any suitable material such as hard or soft rubber, aluminum alloy, etc. An advantage of the embodiments illustrated in FIG. 31 is that the foot rests may also function as fastening aids or tools to help the installer tighten the protective inserts 146 and 148 to the bottom bracket of a pedal bike. They may, for example, aid the installer in applying torque to tighten the inserts if the connector 150 and hole 152 are fabricated with mating threads.

Since the inventive principles of this patent disclosure can be modified in arrangement and detail without departing from the inventive concepts, such changes and modifications are considered to fall within the scope of the following claims.

The invention claimed is:

1. A conversion kit for converting a pedal bicycle to a balance bicycle by removing the pedals, cranks and a spindle from the pedal bicycle and replacing them with components of the conversion kit, the pedal bicycle comprising a bottom bracket, the conversion kit comprising:
    a first protective insert having an interface adapted to engage a first end of the bottom bracket of the bicycle;
    a second protective insert having an interface adapted to engage a second end of the bottom bracket, opposite the first end; and
    a connector adapted to connect the first protective insert to the second protective insert, thereby securing the first and second protective inserts to the bottom bracket;
    wherein the connector is adapted to adjust a distance between the first and second protective inserts, thereby accommodating variability in a width of the bottom bracket.

2. The system of claim 1 further comprising:
    a first adapter having:
        a first interface adapted to engage the interface of the first protective insert, and
        a second interface adapted to engage the first end of the bottom bracket; and
    a second adapter having:
        a first interface adapted to engage the interface of the second protective insert, and
        a second interface adapted to engage the second end of the bottom bracket, opposite the first end.

3. The system of claim 1 wherein the connector is integral with the first protective insert.

4. The system of claim 3 wherein:
    the second protective insert includes a threaded portion; and
    the connector includes a portion that is threaded to engage the threaded portion on the second protective insert.

5. The system of claim 1 wherein:
    the connector comprises a threaded screw;
    the first protective insert includes a hole running from a first side to a second side and sized to accept the screw; and
    the second protective insert includes a threaded portion on a first side to engage the threaded screw.

6. The system of claim 5 wherein the hole includes a recessed portion to accommodate a head of the screw.

7. The system of claim 6 wherein:
the screw comprises a flat-head screw; and
the recessed portion comprises a countersunk portion.

8. The system of claim 1 further comprising:
a first sealing member arranged to provide a seal between the first protective insert and the first end of the bottom bracket; and
a second sealing member arranged to provide a seal between the second protective insert and the second end of the bottom bracket.

9. The system of claim 8 wherein:
the interface of the first protective insert includes a groove to receive the first sealing member; and
the interface of the second protective insert includes a groove to receive the second sealing member.

10. The system of claim 8 wherein the first and second sealing members comprise O-rings.

11. The system of claim 1 wherein the interfaces of the first and second protective inserts each have a profile adapted to facilitate alignment of the protective inserts with the bottom bracket.

12. The system of claim 11 wherein the profile comprises a portion sized and shaped to match a profile of a bearing race in the bottom bracket.

13. The system of claim 12 wherein the first and second protective inserts are fabricated from a rigid material and fit closely in bearing races, thereby protecting the bottom bracket from distortion in case of impact.

14. The system of claim 13 wherein the profile comprises a stepped profile having a rounded shoulder.

15. The system of claim 11 wherein the profile is adapted to engage a bearing in the bottom bracket.

16. A conversion kit for converting a pedal bike to a balance bike by removing the pedals, cranks and a spindle from the pedal bike and replacing them with components of the conversion kit, the pedal bike comprising a bottom bracket, the conversion kit comprising:
a first protective insert having means for engaging a first end of the bottom bracket;
a second protective insert having means for engaging a second end of the bottom bracket opposite the first end; and
means for securing the first and second protective inserts to the bottom bracket and accommodating variability in a width of the bottom bracket.

17. The system of claim 16 further comprising:
first means for adapting the first protective insert to the first end of the bottom bracket; and
second means for adapting the second protective insert to the second end of the bottom bracket.

18. A method for converting a pedal bike to a balance bike comprising:
removing the pedals, cranks and a spindle from the pedal bicycle;
coupling a first protective insert to a bottom bracket of the pedal bike to protect a first end of the bottom bracket;
coupling a second protective insert to the bottom bracket to protect a second end of the bottom bracket; and
coupling a connector between the first protective insert and the second protective insert, thereby securing the first and second protective inserts to the bottom bracket.

19. A method for converting a pedal bike to a balance bike comprising:
removing the pedals, cranks, bearings, and a spindle from the pedal bicycle;
coupling a first protective insert to a bottom bracket of the pedal bike to protect a first end of the bottom bracket;
coupling a second protective insert to the bottom bracket to protect a second end of the bottom bracket; and
coupling a connector between the first protective insert and the second protective insert, thereby securing the first and second protective inserts to the bottom bracket.

* * * * *